Aug. 13, 1940.                  J. HOCH                    2,211,621
                    SAFETY DEVICE FOR MOLDING MACHINES
                  Filed May 17, 1938          2 Sheets-Sheet 1

INVENTOR
John Hoch
BY
ATTORNEY

Aug. 13, 1940.        J. HOCH        2,211,621
SAFETY DEVICE FOR MOLDING MACHINES
Filed May 17, 1938        2 Sheets-Sheet 2
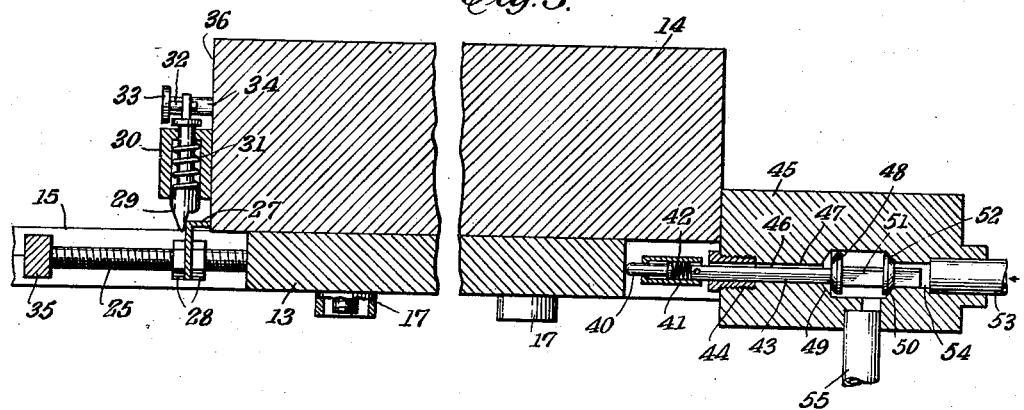
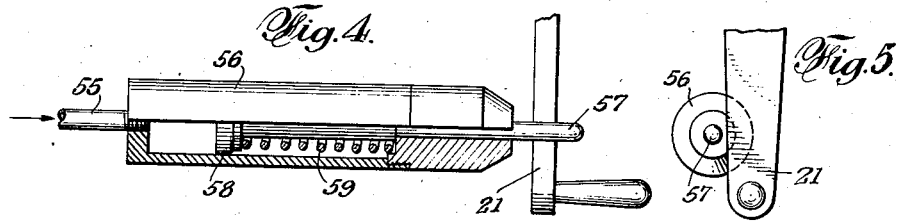 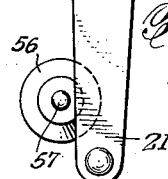
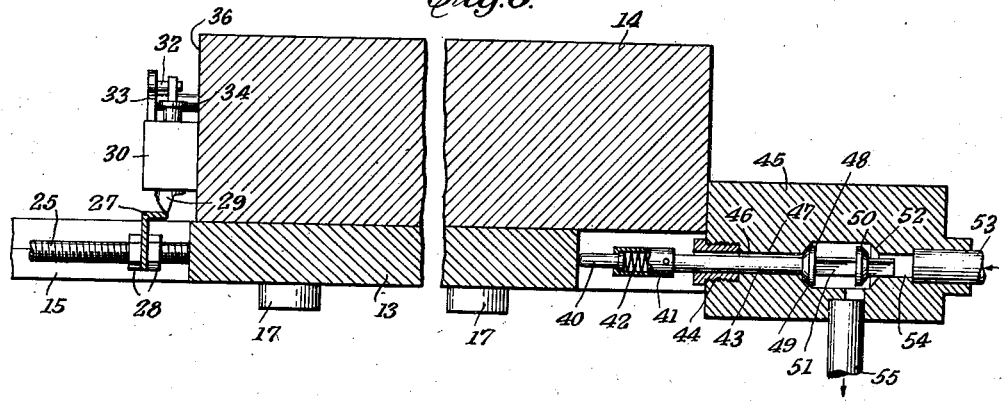
INVENTOR
John Hoch
BY
Harry Jacobson
ATTORNEY Patented Aug. 13, 1940

2,211,621

UNITED STATES PATENT OFFICE 2,211,621

SAFETY DEVICE FOR MOLDING MACHINES

John Hoch, Corona, Long Island, N. Y., assignor to Victor Metal Products Corporation, Brooklyn, N. Y., a corporation of New York Application May 17, 1938, Serial No. 208,341

9 Claims. (Cl. 18—16)

This invention relates to molding presses for synthetic resinous compositions and particularly to the means for preventing operation of the press should the mold parts thereof not have been arranged in their proper positions.

In presses for molding certain types of moldable synthetic resinous compositions, such as are sold, for example, under the trade-mark "Bakelite," the operation of the hydraulic ram of the press is manually controlled by a suitable valve handle which controls the admission of the hydraulic fluid to the ram, which carries a mold part. A cooperating mold part is removably supported by a fixed part of the press and may be removed with the finished molded articles thereon after the molding operation has been completed. The finished articles are then removed from the removable mold, which may then be reinserted into the machine preparatory to a repetition of the molding operation. Should, however, the removable mold part not have been reinserted into the machine in its exact proper position, as sometimes occurs, operation of the press results in damage to or breakage of the expensive molds.

My invention therefore contemplates the provision of means for preventing operation of the control valve for the hydraulically operated mold part, unless and until the removable mold part has been reinserted in its proper position in the press.

My invention further contemplates the provision of a fluid pressure responsive stop automatically interposed in the path of the control valve handle to prevent operation of said handle when the removable mold part is out of its operative position.

The various objects of the invention will be clear from the description which follows and from the drawings, in which, Fig. 1 is a fragmentary and diagrammatic elevational view of part of a typical molding press, showing my invention applied thereto.

Fig. 3 is an enlarged vertical section of the same taken on the line 3—3 of Fig. 2.

Fig. 4 is a combined front elevation and section of the safety-stop pin for preventing operation of the control handle.

Fig. 5 is a side elevation of the same.

Fig. 6 is a view similar to Fig. 3, showing the positions assumed by certain of the parts when the removable mold is not in its operative position.

Figure 1:
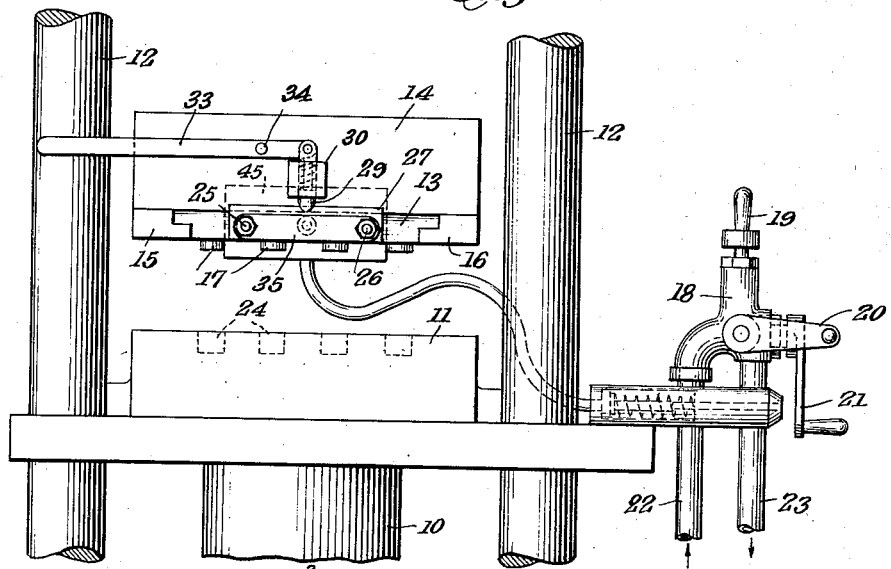
Figure 2:
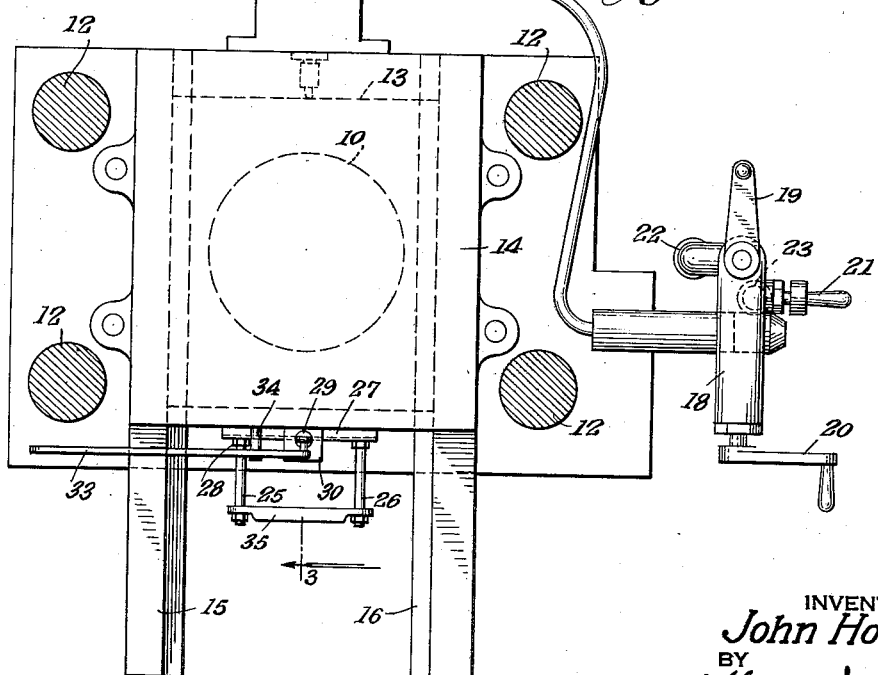
Fig. 2 is a top plan view of the same.

In the practical embodiment of my invention which I have shown by way of example, my invention has been applied to a molding press provided with the hydraulic ram 10 carrying the lower mold part 11 and reciprocating vertically on the standards 12 in response to the fluid pressure thereon. The upper mold part 13 is adapted to be slidably inserted into the fixed mold carrier 14, said carrier being provided with suitable guides as 15, 16 for supporting the upper mold 13 while it is moved horizontally to remove it from and to reinsert it into the mold carrying member 14. The control valve 18 is of any well-known type used in presses of the character being described, and is provided with control handles 19, 20 and 21. Said valve is connected to a source of hydraulic pressure as by means of the pipe 22 and is also operatively connected to the hydraulic ram 10 as by means of the pipe 23, in a manner which is well understood and hence needs no further description nor illustration. Suffice it to say, that the control handle 21 controls the upward movement of the ram 10 and the mold 11, and that no movement of said ram can occur unless the control handle 21 is suitably operated manually in the proper direction and to the required extent.

I have illustrated the upper mold 13 as carrying suitable mold parts or cores 17 designed to enter corresponding cavities 24 in the lower mold 11, so as to produce internally threaded caps for collapsible tubes, when suitable composition is deposited in the openings 24 and the lower mold 11 raised into pressed contact with the upper mold 13 and heat and pressure applied. It will be understood, however, that my invention is not limited to the particular objects produced by the press or molds thereof, nor to the character of the mold cavities or cores, but is directed primarily to the means for preventing upward movement of the lower mold 11, should the upper mold 13 not have been arranged in its proper place. As has been indicated, said upper mold is slidable into place on the guides 15 and 16. It is also locked in its exact proper position by suitable means which will not be described, preparatory to the movement of the lower mold.

Said locking means comprises the threaded rods 25 and 26 projecting horizontally from the front end of the upper mold 13 and adjustably carrying the angle cross bar 27 thereon, which bar is adjusted and locked by the nuts 28 on the rods 25 and 26. For cooperating with the cross bar to lock the upper mold in position in the mold carrier 14, the latch 29 is slidably supported in the cylinder 30 and is normally urged downwardly into its locking position by the spring 31 surrounding an intermediate portion of said latch and arranged inside of the cylinder 30. At its upper end, the latch 29 projects from the cylinder and is connected as by means of the pin 32 to the lever 33, pivoted as at 34 to the mold carrier 14. In the position of the parts shown in Fig. 6, the left end of the lever 33 has been depressed, thereby raising the latch 31 out of its engagement with the cross bar 27 and thus freeing the upper mold 13 for removal from the machine as by means of the handle 35. In that position of the parts shown in Figs. 1 and 3, wherein the cross bar 27 is in contact with the front face 36 of the member 14, the left end of the lever 33 has been raised under the action of the spring 31 which also serves to depress the latch 29 into a position in front of the cross bar 27 thereby to lock the mold 13 in its proper position.

It will be understood that the synthetic resinous material, preferably in powdered form, is deposited in the mold cavities 24, whereafter, if the mold 13 has been locked in its proper position, the various control handles 19, 20 and 21 are operated in the proper order to control the raising of the lower mold 11 and also to control the pressure applied thereto in its final position to mold the desired articles. It will further be understood that the control handle 21 is the one which controls the upward movement of the lower mold member, and should operation of said handle 21 be prevented, such movement of the lower mold cannot occur. With the above in mind, the description will now proceed of the means for preventing operation of the control handle 21 should the mold 13 not be arranged in its exact proper position.

Arranged in the path of the final part of the horizontal movement of the upper mold 13 into its operative position is the pin 40, slidable horizontally in the cylinder 41 and urged forwardly by the spring 42 in said cylinder. Said spring is secured near its rear end to the slidable rod 43 mounted in the fixed sleeve 44 which is in turn secured to the block 45, fixed to the mold carrier 14. The rod 43 is not completely cylindrical but is provided with a flat face 46 to provide a space between said face and the opening 47 in which said rod reciprocates. At the rear end of the rod 46 is the preferably tapered conical valve 48 adapted to seat on its valve seat 49 and to close the opening 47. A second similar valve 50 is connected to the valve 48 by means of the preferably triangular connecting member 51 therebetween. The valve 50 is adapted to seat on its valve seat 52 when the valve 48 is in the position shown in Fig. 3, that is, to the right of its valve seat 49. Through the pipe 53 and the opening 54 compressed air or other suitable fluid under pressure is directed at all times against the valve 50. When said valve 50 is resting on its seat 52, communication between the pipes 53 and 55 is prevented.

Said pipe 55 leads to the cylinder 56, in which is mounted the stop pin 57. At its left end, as viewed in Fig. 4, the stop pin is provided with the piston 58, which is normally urged by the spring 59 toward the left end of the cylinder. That is, the spring 59 tends to retract the pin 57 within the cylinder and out of the way of the control handle 21. When, therefore, the parts are in the position shown in Fig. 3, wherein no fluid pressure acts on the left side of the piston to move it toward the right, the piston is moved by the spring 59 toward the left, the pin 57 is retracted and the control handle 21 may be operated. When, however, as in Fig. 6, the rod 40 is moved towards the left from the position shown in Fig. 3, that is, when the mold 13 releases said rod 40 by being partly withdrawn from its proper position, the valve 50 is removed from its seat by the fluid pressure thereon through the pipe 53, thereby permitting the fluid under pressure to enter the pipe 55 and to act upon the piston 58 to move said piston towards the right against the action of the spring 59 and to project the pin 57 into the path of the control handle 21.

The fluid, such as compressed air, which is in front of the valve 50 is discharged to a large extent, sufficient to reduce any back pressure on said valve, through the opening 47 and the sleeve 44, whereby little or no resistance is offered to the unseating movement of said valve, and the pressure on the piston 58 is also cut off when the valve 50 is closed. When the valve 50 is open, the valve 48 is closed and pressure is exerted upon the piston to move the pin into its stop position.

Movement of the rod 43 towards the left from the position of Fig. 3, is prevented when the upper mold 13 is in its proper molding position, that is, when it is moved into position to carry the cross bar 27 thereof against the face 36 of the mold carrier. In that position, the tray is locked so that the mold cores 17 may properly enter the cavities 24, the pin 57 is retracted, and the handle 21 may be operated to cause operation of the ram 10 and the pressed engagement of the molds.

It will be noted that even a slight displacement of the upper mold 13 from its proper operative position shown in Fig. 3, releases the pressure of the mold on the rod 43 sufficiently to permit the fluid pressure through the pipe 53 to open the valve 52, the spring 42 not being strong enough to maintain the valve closed with the aid of full pressure on the rod 40. It is only when said mold 13 is in its exact proper position that the valve 52 is completely closed thereby permitting the spring 59 to retract the pin 57 out of the path of the control handle.

It will further be seen that I have provided means for serving effectively to prevent operation of the control handle and hence to prevent upward movement of the mold 11, unless the parts are properly positioned for such movement and hence no damage to the parts or to the operator can occur accidentally.

While I have shown and described a certain specific embodiment of my invention, I do not wish to be understood as limiting myself thereto, but intend to claim the invention as broadly as may be permitted by the state of the prior art and the scope of the appended claims.

I claim:

1. In a molding press operated by fluid pressure and provided with a movable mold, the movement of which is controlled manually by a control handle, a removable mold, means for fixing the mold in its operative position in the press, and means for preventing operation of the handle, said means being responsive to fluid pressure and being interposed in the path of movement of the control handle when the removable mold is displaced from its operative position, said means comprising a pin, a spring normally urging said pin out of the path of movement of the control handle, a piston carried by the pin and responsive to fluid pressure put thereupon to interpose the pin into the path of movement of the control handle, and means including a valve for cutting off the fluid pressure upon the piston only when the removable mold is in its operative position and for introducing fluid pressure upon the piston in all other positions of the removable mold.

2. In a molding press operated by fluid pressure and provided with a movable mold, the movement of which is controlled manually by a control handle, and also provided with a mold removable from the press and with means to fix the mold in its operative position in the press, a stop member responsive to fluid pressure and normally interposed in the path of the control handle, a valve controlling the supply of fluid under pressure to the member, means operated by the removable mold to close the valve when the mold is in its operative position and to open the valve when the mold is displaced from said position, and a spring urging said member into its retracted position out of the path of movement of the control handle.

3. In a press of the character described and provided with a removable mold and with a handle controlling the operation of the press, a valve, means operated by the mold for closing said valve only when the mold is in its operative position in the press, said valve being responsive to fluid pressure exerted thereupon to open the valve when the mold is displaced from its operative position, a stop member and fluid pressure responsive means controlled by the valve for interposing said member in the path of movement of the control handle when the valve is open.

4. In a press of the character described provided with a removable mold having a single operative position and with a control handle, a stop member interposed in its stop position in the path of movement of the control handle and preventing operation of said handle when the mold is displaced from its operative position, fluid pressure responsive means for moving said member into its stop position, said means being rendered inoperative by the mold when the mold is in its operative position, and spring means for retracting the member into its inoperative position when the mold is in its operative position.

5. In a press of the character described provided with a removable mold and with a control handle, means for preventing operation of the handle when the mold is displaced from its operative position and for permitting operation of said handle when the mold is in its operative position, said means comprising a stop member for the handle responsive to fluid pressure thereon to move the member into its stop position, means operated by the mold for cutting off the supply of fluid under pressure to the member, and spring means for retracting the member out of its stop position when the mold is in its operative position.

6. In a press of the character described provided with a removable mold and with a control handle, means for preventing operation of the handle when the mold is displaced from its operative position and for permitting operation of said handle when the mold is in its operative position, said means comprising a stop member for the handle responsive to fluid pressure thereon to move the member into its stop position, and means operated by the mold for cutting off the supply of fluid under pressure to the member.

7. In a press of the character described, a removable mold movable into and out of its operative position, a control handle for operating the press, a cylinder, a stop pin interposable in the path of the control handle and movable into and out of said cylinder, a piston carried by the pin within the cylinder, a spring urging said pin to a retracted position within the cylinder, a slidable valve controlling the admission of fluid under pressure into the cylinder, a member arranged to engage the mold in the operative position of the mold, and a yieldable connection between said member and the valve.

8. In a press of the character described, a slidable rod, a pair of longitudinally spaced valves on said rod, a valve seat for each of the valves arranged a greater distance apart than said valves whereby one of said valves is open when the other is closed, a retractible and extensible stop member movable by fluid under pressure into its stop position, said valves controlling the supply of fluid to said member, and means for retracting the member out of its stop position when the press is ready for operation, said last-mentioned means being rendered inoperative by said valves when the press is not ready for operation.

9. In a press of the character described, a removable mold, retractible and extensible stop means movable by fluid under pressure into an operative stop position thereof wherein operation of the press is prevented, means for supplying fluid under pressure to said stop means when the press is not ready for operation, control means in the path of movement of the mold for rendering the fluid supplying means inoperative to actuate the stop means when the press is ready for operation and means independent of the fluid pressure supply means for retracting the stop means out of its stop position when the press is ready for operation.

JOHN HOCH.